United States Patent [19]
Lehne

[11] Patent Number: 4,484,773
[45] Date of Patent: Nov. 27, 1984

[54] DETACHABLE LOW-PROFILE LATCH ASSEMBLY FOR RELEASABLY HINGED CLOSURE PANELS
[75] Inventor: John Lehne, Hacienda Heights, Calif.
[73] Assignee: LeVan Specialty Co., Inc., City of Industry, Calif.
[21] Appl. No.: 417,134
[22] Filed: Sep. 13, 1982
[51] Int. Cl.³ .............................................. E05C 17/32
[52] U.S. Cl. ........................... 292/263; 292/DIG. 49; 292/304; 296/218; 49/465
[58] Field of Search .............. 292/190, 191, 263, 304, 292/DIG. 49; 296/218; 49/394, 465

[56]  References Cited
U.S. PATENT DOCUMENTS

| 3,974,753 | 8/1976 | Blomgren et al. | 292/263 X |
| 4,067,605 | 1/1978 | Green et al. | 292/263 X |
| 4,193,628 | 3/1980 | Sorensen | 49/465 X |
| 4,205,875 | 6/1980 | Smith | 296/218 |
| 4,257,632 | 3/1981 | DeStepheno | 292/263 |
| 4,364,600 | 12/1982 | Hauber | 296/218 |
| 4,371,204 | 2/1983 | Georg et al. | 296/218 |
| 4,394,044 | 7/1983 | Hough et al. | 296/218 |
| 4,402,536 | 9/1983 | Green et al. | 49/465 X |

Primary Examiner—Gary L. Smith
Assistant Examiner—Thomas J. Dubnicka
Attorney, Agent, or Firm—Francis X. LoJacono

[57] ABSTRACT

A removable latch assembly to be used in conjunction with releasably hinged closure panels, and more particularly for use in combination with a removable glass panel and an associated fixed frame structure such as employed with sunroofs for vehicles, wherein the assembly includes a toggle-jointed latch defined by a latch handle and a demountable anchor bracket interconnected by toggle-arm members. The opposite end of the latch handle is pivotally connected to a mounting bracket attached to the panel; and the toggle-arm members are pivotally connected to a demountable anchor bracket that is removably secured to the fixed frame structure by means of a keeper linked to the anchor bracket. The latch assembly is so arranged as to establish a low-profile position with in the opening of the frame structure when in both a closed and an open mode.

9 Claims, 9 Drawing Figures

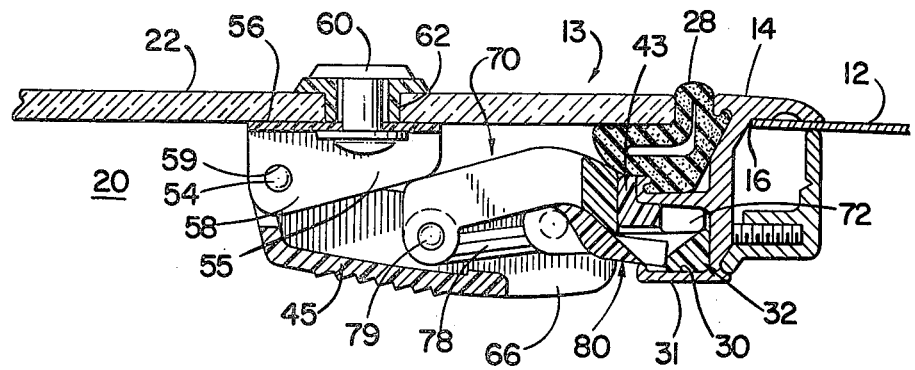
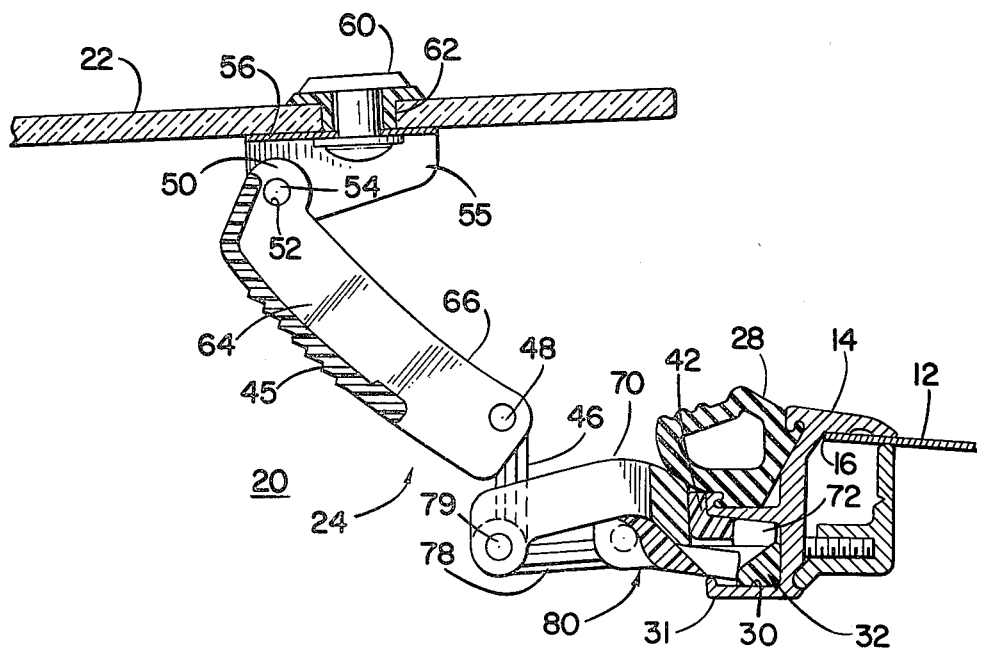

DETACHABLE LOW-PROFILE LATCH ASSEMBLY FOR RELEASABLY HINGED CLOSURE PANELS

BACKGROUND OF THE INVENTION

1. Field of the Invention

This invention relates generally to a latching device for movable panels, and more particularly to a detachable latch assembly for sunroofs used in vehicles and the like, wherein the assembly is formed having a low profile since it is located within the opening of the frame structure and level with or above the lower plane of the fixed frame structure of the sunroof.

2. Description of the Prior Art

Due to the various governmental safety requirements and standards set forth for vehicles and vehicle accessories, both in the United States and particularly in foreign countries, various problems and difficulties are being encountered in providing not only suitably constructed sunroof devices, but also in providing suitable hinge and latch mechanisms that complete the overall sunroof apparatus.

Many types of latching devices are employed for the openings of hinged panels or windows; however, these devices, although workable, have features that restrict their use due to the ever-growing demands for safety requirements and improved standards for vehicles.

In particular, sunroofs have become a very popular after-market type of vent window adapted to be retrofitted in the roofs of all types of automobiles and related vehicles. Such a sunroof is designed generally to be mounted in an opening formed in the vehicle roof, and extends across the major width of the vehicle roof—preferably positioned directly over the front driver and passenger seats. A frame structure having a generally rectangular configuration is affixed within the opening in the vehicle roof; and a pair of hinges and at least one latch are attached to the frame structure so as to support and secure the window panel in a hingeable position.

Accordingly, the closure panel is removable mounted in the opening of the frame structure which includes hinge members positioned along the leading or forward edge of the closure panel. The rear or trailing edge thereof is adapted to be pivoted between a closed/sealed position and an open position, which is a forwardly inclined venting position.

As an example of a known latch mechanism, U.S. Pat. No. 3,974,753 discloses a device that is detachable from the window panel, whereby the panel can be completely removed from the fixed frame structure. As is disclosed therein, when the latching mechanism is disconnected, the greater part thereof is still secured to the fixed frame. This creates a safety hazard, since the mechanism is either left to hang inside the vehicle or protrude within the frame opening.

Another type of detachable latching device is disclosed in U.S. Pat. No. 4,257,632 which has overcome many of the present problems, but is so arranged that the major portions of the latch handle and linkage are located below the sunroof frame structure, thus also creating a problem—particularly in meeting the standards under new requirements of various foreign countries.

SUMMARY AND OBJECTS OF THE INVENTION

The present invention has for an important object to provide a detachable latch mechanism to overcome the existing problems known in the art, and to establish such a latch mechanism that includes several unique features. One of these features is that there is no protrusion of the latch mechanism, including the latch handle and its linkage, past the bottom of the frame line and into the area beneath the headliner of the vehicle, when the hinged glass panel is positioned either in an open or a closed mode.

Another object of the invention is to provide a latching mechanism which includes a self-attached releasable keeper which allows the anchor bracket member to be releasably secured to the frame structure of the sunroof, the keeper being hingedly connected to the anchor member, wherein both the anchor member and the keeper member are designed to be received and held in a retainer member.

It is still another object of the invention to provide a retainer which is adapted to receive releasable hinges as well as the associated detachable latch handle; thus, fewer parts are required in the construction of this particular sunroof.

Still another object of the invention is to provide a mechanism of this type in combination with detachable hinges which allows the window panel to be completely removed from the fixed frame structure; and wherein the latch device and the hinge members are also easily removed along with the window panel, so as not to present a safety hazard to the occupants within the vehicle when the panel is removed therefrom.

A further object of the invention is to provide a detachable latching device which is simple to remove and to replace, but requires two specific operations before it can be separated from the frame structure—thus preventing accidental disengagement.

Still a further object of the invention is to provide a mechanism of this character that does not require any tools or pins to secure the window panel in place, or to secure or remove the anchor member from the fixed frame.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particuarly to the accompanying drawings, which are for illustrative purposes only:

FIG. 3 is a longitudinal cross-sectional view of the latching device attached to the frame structure, with the window panel in a secured/closed position;

FIG. 4 is a cross-sectional view similar to that of FIG. 3, showing the latch in an extended position, thereby fixing the window panel in an open mode;

DESCRIPTION OF THE PREFERRED EMBODIMENT

Figure 1:
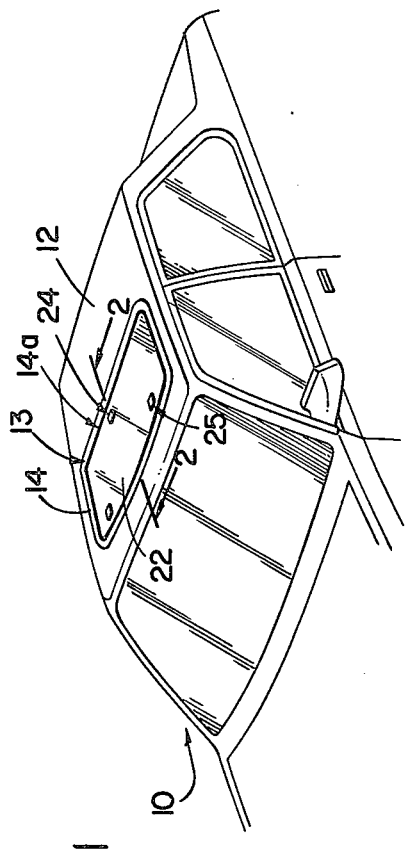
FIG. 1 is a pictorial view of a sunroof having a hinged glass panel and its associated frame structure mounted in the roof of a vehicle.
Figure 2:
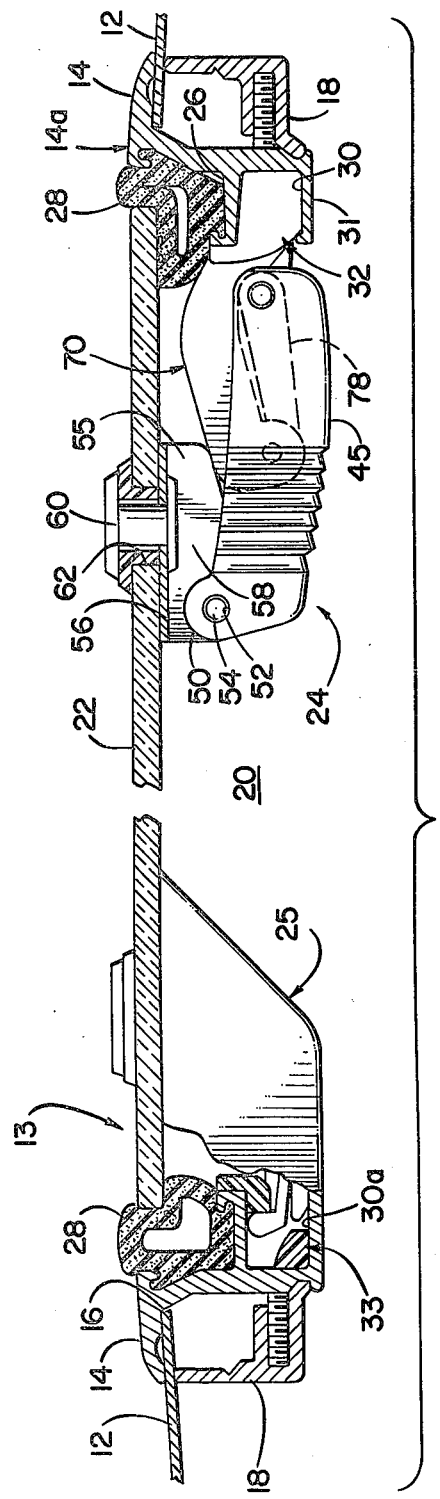
FIG. 2 is an enlarged cross-sectional view taken substantially along line 2—2 of FIG. 1, showing the detachable latching handle mechanism in a secured/closed position in cooperation with releasable hinge devices, the panel being locked in a closed mode.

Referring more particularly to FIG. 1, there is illustrated an upper half of a typical vehicle, generally indicated at 10, having a roof structure 12 in which a sunroof 13 is mounted. The sunroof is generally defined by a fixed frame structure 14 mounted within an opening 16 formed in roof 12. Frame structure 14 is fixedly secured to the peripheral edge of opening 16 in a suitable manner, indicated by an annular clamping ring 18, as illustrated in FIG. 2, the frame structure 14 defining an access opening 20 which is closed by a glass panel or window 22. Panel 22 is shown locked in a closed mode by the present invention, a detachable latch handle device, indicated generally at 24, and a pair of releasable hinge devices, indicated at 25. The releasable hinge devices can be any suitable type compatible with the present invention. However, the quick-release hinge device 25 as illustrated in FIG. 2 is particularly desinged to operate with the present detachable latch handle mechanism 24. A separate patent application Ser. No. 339,329, now U.S. Pat. No. 4,428,155 has been filed on the hinge device as shown herein.

It should be noted that, although a single latching mechanism is shown, it is contemplated that a pair of latching mechanisms can be employed where required. However, in most applications and as herein illustrated, panel 22 is normally provided with a single latching device 24 which is centrally positioned along the trailing edge of the panel, so as to cooperate with the oppositely disposed pair of hinge devices 25 mounted adjacent the front or leading edge of panel 22.

Accordingly, frame structure 14 is formed with an upper channel 26 adapted to receive a sealing member 28 therein for peripheral engagement with panel 22, when the panel is in a closed/sealed mode as illustrated herein. Frame structure 14 further includes a second, lower, peripheral channel 30 which is arranged to receive a coupling means defined by retainer members 32 and 33, the retainer members being affixed therein. The retainers 32 and 33 are identical in configuration. A pair of the retainer members 32 is positioned in lower channel 30 so as to detachably receive latching mechanism 24. Retainer members 33 are also secured in the lower channel section 30a, whereby the releasable hinge member 25 is adapted to be coupled thereto.

Figure 9:
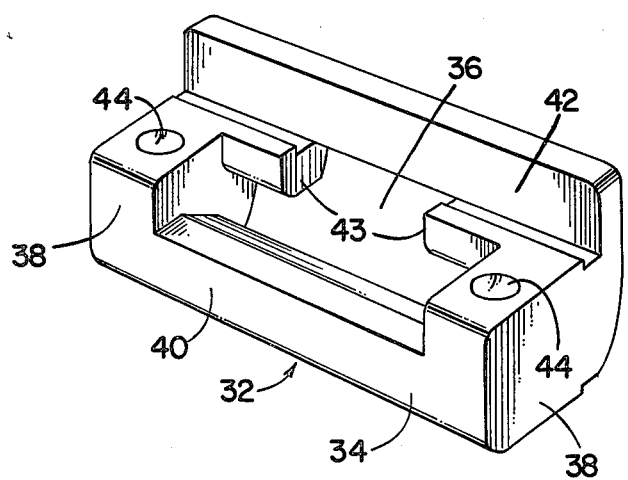
FIG. 9 is a perspective view of the retainer member.

Each retainer member (See FIG. 9.) is formed having a main body 34 with an elongated opening 36 defined by opposing end walls 38 interconnected by rear strut member 40 and a front flange member 42. Integrally formed as part of end walls 38 and front flange member 42 is a pair of oppositely disposed coupling bars 43 adapted to receive one of the tongue members of latching unit 24, which will hereinafter be described in detail. The upper and lower surfaces of each wall 38 include detents 44, the detents being located to receive corresponding projections formed within channel 30, thereby securing each retainer in its proper position for engagement with the respective tongue members.

As for the detachable latching mechanism 24, one or more may be employed—but only one would normally be used. Accordingly, a latching unit 24 is located along the rearward portion of sunroof 13. That is, the rearward edge of panel 22 is interlocked to the rear section 14a of the main frame 14. The latching mechanism 24 of the present invention is so designed as to latch panel 22 in a sealed/closed position. Unit 24 is recessed within opening 20 so as to be substantially in same plane as the bottom wall 31 of the lower channel 30; this has not been accomplished in the art heretofore. Thus, when window panel 22 is repositioned in an open mode as illustrated in FIG. 4, latch mechanism 24 is still within opening 20 and above the plane of bottom wall 31. Hence, at no time—either in a closed or an open mode—does any part of the latching mechanism protrude in a depending manner below the frame structure of the sunroof, or into the area beneath the headliner (not shown) of the vehicle 10.

Moreover, the latching mechanism is further designed to cooperate with releasable hinge means 25. The disengaging of latch unit 24 and hinges 25 will allow closure panel 22 to be completely separated and removed from the frame structure 14, thereby leaving a clear unobstructed opening 20 through the roof of vehicle 10.

Figure 5:
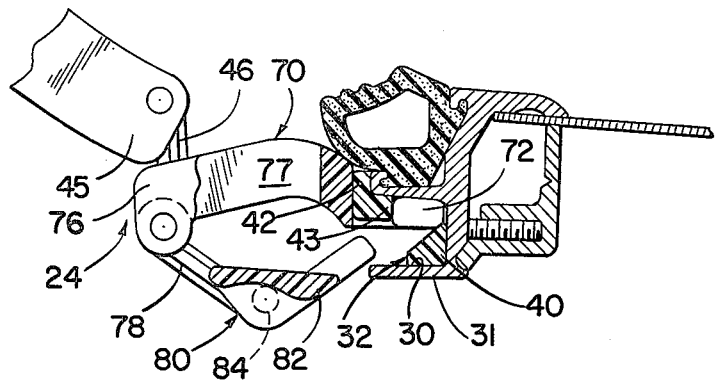
FIG. 5 is a cross-sectional view of the latch device, showing the keeper member separated from the retainer member, the retainer member being fixed within the channel of the frame structure.
Figure 6:
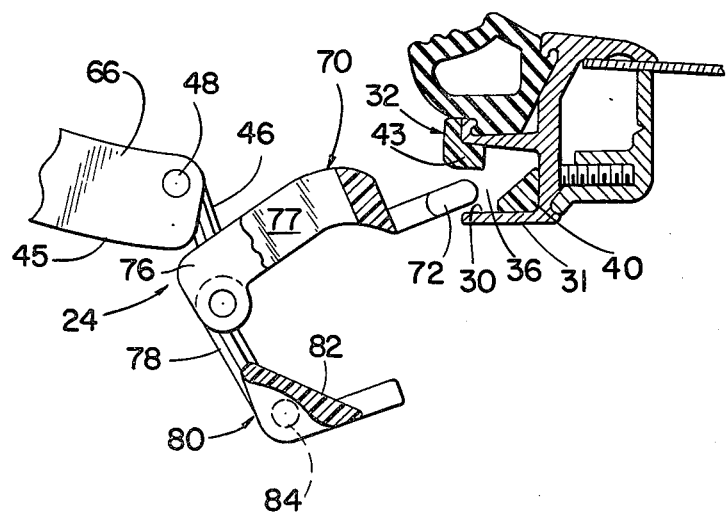
FIG. 6 is a cross-sectional view, showing the latch device in a fully detached position relative to the retainer and frame structure.

The detachable latching device 24 comprises a toggle-jointed latch having a latch-handle member 45 which is toggle-jointed and a pair of toggle arm members 46. Handle member 45 is pivotally connected by means of pin 48 to the oppositely positioned toggle arms 46 which define an articulated joint therebetween, allowing a geniculating action between latch handle 45 and arms 46. Thus, the arms are foldable within handle 45 when in a closed mode as seen in FIGS. 2 and 3, and are fully extended when in an open mode as seen in FIGS. 4, 5 and 6.

Latch handle 24 comprises a channel-shaped housing having at its upper end a pair of ear members 50. Bore 52 is disposed through each ear member so as to receive pivot pin 54, thus establishing a connecting pivot means between handle 45 and a mounting bracket 55. Mounting bracket 55 is formed having a flat intermediate plate 56 and depending ear members 58 in which bores 59 are formed, so as to receive pins 54 therethrough. Ears 50 of handle 24 are thereby pivotally connected to ears 58 of bracket 55. Mounting bracket 55 is affixed to panel closure 22 by lugs or bolts 60 which are received through hole 62 in panel 22.

The channel housing 64 of handle 45 includes side flanges 66 having holes formed therein to receive toggle pin 48, thereby pivotally connecting one end of each toggle arm 46 to handle 45. The opposite ends of toggle arms 46 are also adapted to be pivotally connected to an anchor means defined by an anchor bracket, generally indicated at 70 and illustrated in FIGS. 4, 5 and 6.

Figure 7:
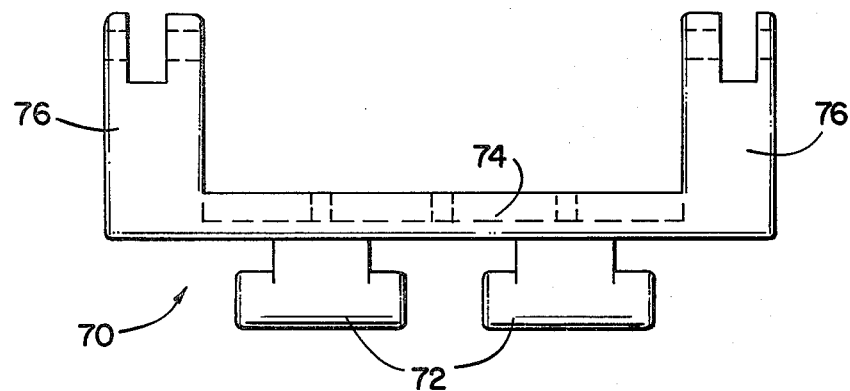
FIG. 7 is a top-plan view of the anchor member.
Figure 8:
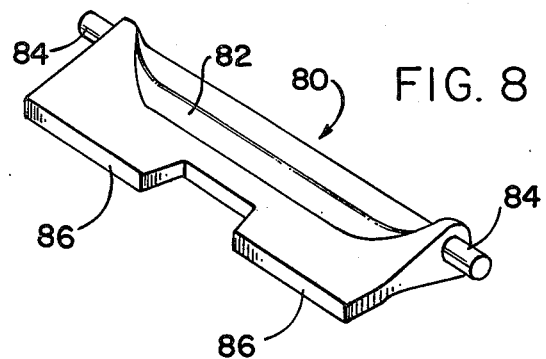
FIG. 8 is a perspective view of the keeper member.

Anchor bracket 70 is so designed as to include a coupling means comprising a pair of anchor-tongue members 72, as seen in FIG. 7. The tongue members project outwardly from a cross-bar member 74 having a pair of linkage arms 76 integrally formed at opposite ends thereof, the linkage arms being adapted to pivotally receive toggle arms 46 and additional keeper arms 78. Thus, pivot pins 79 attach both the toggle arms 46 and the keeper arms to the linkage arms 76 of anchor bracket 70.

Accordingly, for each tongue 72 there is a corresponding retainer member 32 in which the tongue is lockingly engaged, as illustrated in FIGS. 3 through 5. The tongue members 72 are inserted into retainer opening or slot 36, and are hooked behind coupling bars 43. However, in order to secure tongue members 72 in a locked arrangement to the fixed frame structure, a keeper means (generally indicated at 80) is provided. The keeper means is formed having a lateral body member 82 which includes extended pivot pins 84. Pins 84 are adapted to be pivotally mounted in one end of the oppositely disposed keeper arms 78. Thus, keeper member 80 is connected in a toggle-like manner to anchor bracket 70, whereby the anchor bracket is held in place by inserting keeper-lip members 86 of keeper 80 under tongues 72. That is, keeper-lip members 86 wedge between tongues 72 and bottom wall 31 of channel 30.

When anchor means 70 is locked in place and fixed to frame structure 14, as seen in FIGS. 2 and 3, panel 22 can then be positioned in either a closed/sealed mode; or it can be positioned in an opened/vented mode, as seen in FIG. 4.

In order to install the detachable latching handle 24, the window is arranged in a generally open position; and the handle is in an extended mode similar to that seen in FIG. 6. Anchor bracket 70 is then inserted into retainer 32, in the position as previously described, with tongues 72 locked behind members 43 of the retainer. This position is shown in FIG. 5. Keeper member 80 is then inserted into retainer 32 and is forced inwardly until a snapping action takes place. That is, arms 78 and keeper 80 will be forced over center at their pivot point 84, better seen in FIG. 4. A spring-like action is established by the plastic parts because the inherent resilience of the material reacts as a biasing means by an over-center loaded cam action.

It is important to note that the linkage arms 76 of anchor bracket 70 are formed in an arcuate configuration as at 77; this allows keeper member 80 to fit within the arc, whereby all of elements of the handle are positioned above the horizontal plane of the bottom wall 31 of the frame structure, the handle 45 being substantially within opening 20 without any substantial protruberance below the frame structure. Thus, with such an arrangement all of the pivot points of the pivot connections are well above the bottom plane of the frame structure and well within opening 20.

Hence, it can be seen that, when removing the latch assembly from the frame structure two separate mechanical actions are required. However, once the latch assembly is locked into place, the panel is readily positioned in either the open or closed mode. When panel 22 is to be removed, the latch assembly is placed in an open position as in FIG. 4; and keeper 80 is pulled downwardly, so as to be snapped out of channel 30 and retainer 32, as seen in FIG. 5. Once keeper 80 is removed, anchor bracket 70 is readily removed from retainer 32, as shown in FIG. 6. Accordingly, releasable hinge 25 is suitably disconnected from the frame structure, whereby the panel is completely removed—leaving only the recessed retainers affixed in the frame structure. Opening 20 at this time is completely clear of any projections or obstructions.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A detachable latch-handle device for a closure panel having a fixed frame structure, wherein an opening is defined by said frame structure, said device being positioned within said opening and having a low horizontal profile substantially equal to or less than the bottom plane of said frame structure, and wherein said device comprises:

a latch handle secured to said closure panel and interconnecting said fixed frame structure;

a mounting bracket affixed adjacent one edge of said closure panel, one end of said latch handle being adapted to be movably attached thereto;

a retainer means secured to said fixed frame structure;

a demountable anchor means arranged to be releasably secured to said fixed frame structure by said retainer means, and movably connected to said latch handle at the end opposite said mounting bracket, wherein said demountable anchor means comprises an anchor bracket having coupling means adapted to be coupled to said retainer means;

said coupling means comprising a pair of juxtaposed tongue members, and wherein a pair of retainer means are secured in said frame structure to receive said respective tongue members therein for releasably coupling said latch handle to said frame structure;

a releasable keeper means movably connected to said latch handle adjacent said anchor means, whereby said releasable keeper means engages said anchor means so as to lock said coupling means to said retainer means;

wherein said keeper means comprises:

a keeper-body member;

a pair of keeper-arm members pivotally interconnecting said keeper body with said anchor bracket; and wherein said keeper body includes a pair of keeper-lip members adapted to be received in said retainer means, whereby said anchor bracket is locked in a fixed position with said frame structure;

a pair of toggle-arm members, each being pivotally connected at one end to said latch handle, and at the opposite end to said anchor bracket; and wherein pivot means is provided at each pivotal connection to allow articulate movement of said latch handle, whereby said closure panel can be positioned in a closed or open mode.

2. A detachable latch-handle device as recited in claim 1, wherein each of said pivotal connections thereof are located within said opening defined by said frame structure and above the bottom horizontal plane of said frame structure.

3. A detachable latch-handle device as recited in claim 1, wherein said anchor bracket includes a pair of linkage-arm members having an arcuate configuration to allow said keeper means to be positioned in an over-center cam-action locking arrangement.

4. A detachable latch-handle device as recited in claim 1, wherein said keeper means is provided with biasing means, whereby said keeper lips are forceably engaged in said retainer means so as to secure said anchor bracket in a fixed relation to said frame structure.

5. A detachable latch-handle device as recited in claim 4, wherein said retainer means comprises a retainer member secured to said frame structure and recessed therein, said retainer member having a slot therein and a pair of oppositely disposed coupling bars adapted to engage said tongue members of said anchor bracket.

6. In combination, a detachable latch-handle device adapted to be releasably coupled between a fixed frame structure and a movable closure panel, wherein said frame structure includes a peripheral sealing member, said combination comprising:

a fixed frame structure defining an opening;
a movable closure panel hingedly attached to said frame structure;
a releasable hinge means secured to said panel;
a latch-handle device having a latch handle secured to said panel, and interconnecting said closure panel to said frame structure;
a demountable anchor means arranged to be releasably secured to said frame structure and movable connected to said latch handle, said anchor means comprising an anchor-bracket member having coupling means formed thereon to be coupled to said frame structure;
a releasable keeper means movably connected to said latch handle adjacent said anchor means, whereby said releasable keeper means engages said anchor means, thereby locking said coupling means to said frame structure; and
retainer means fixedly mounted to said frame structure, and adapted to receive said releasable keeper means and said anchor means therein;
a mounting bracket pivotally attached to said latch handle and secured to said movable closure panel;
a pair of toggle-arm members, each being pivotally connected at one end thereof to said latch handle and at the opposite end to said anchor bracket;
wherein pivot means is provided at each pivotal connection to allow articulate movement therebetween, whereby said closure panel can be positioned in a closed or an open mode;
and wherein a pair of keeper-arm members are pivotally interconnected between said anchor means and said keeper means.

7. The combination as recited in claim 6, wherein each pivotal connection thereof is positioned within said opening defined by said frame structure, and above the bottom horizontal plane of said frame structure.

8. The combination as recited in claim 7, wherein said coupling means comprises at least one tongue member adapted to be inserted and coupled to said retainer means.

9. The combination as recited in claim 8, wherein said keeper means comprises:

a keeper-body member pivotally connected to one end of said keeper arm members;
at least one projecting lip member formed on said keeper body and adapted to be received in said retainer means, whereby said anchor bracket is locked in a fixed position with said frame structure, and said latch handle is movable so as to position said closure panel in either a closed or an open mode.

* * * * *